1

3,171,838
AROYLALKYL AND HYDROXYARALKYL DERIVATIVES OF 4-(N-ARYLALKANAMIDO)-PIPERIDINES AND RELATED COMPOUNDS
Paul A. J. Janssen, Vosselaar, near Turnhout, Belgium, assignor to Research Laboratorium Dr. C. Janssen, N.V., Beerse, Belgium, a company of Belgium
No Drawing. Filed Oct. 10, 1961, Ser. No. 144,017
11 Claims. (Cl. 260—293.4)

The present invention relates to a novel group of compounds which are derivatives of 4-anilinopiperidines. More particularly it relates to a group of compounds which can be represented by the following general formula

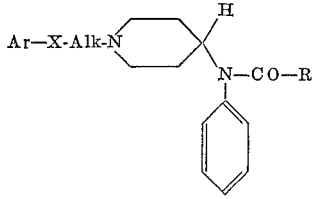

In this formula Ar is a member of the group consisting of phenyl and thienyl; X is a member of the group consisting of —CO—, —CHOH—, and >CHO (lower alkanoyl)

Alk is selected from the group consisting of methylene, ethylene, and alkyl methylene of less than 7 carbon atoms; R is selected from the group consisting of lower alkyl, lower alkoxy, dimethylamino, morpholino, piperidino, and 1-pyrrolidinyl. The lower alkanoyl radicals referred to above are those derived from alkanoic acids of less than 7 carbon atoms. The lower alkyl and lower alkoxy radicals referred to above contain less than 7 carbon atoms and include methyl, ethyl, propyl, butyl, amyl, hexyl, methoxy, ethoxy, propoxy, and butoxy. Illustrative of the embodiments contemplated for Alk are methylene, ethylene, and alkyl methylenes of less than 7 carbon atoms, e.g., methyl methylene, ethyl methylene, propyl methylene, butyl methylene and the like.

The compounds of this invention are useful because of their valuable pharmacological properties. In particular they are very potent analgesics and mydriatics.

The organic bases of this invention form pharmaceutically equivalent, non-toxic, acid-addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic, and aromatic sulfonic acids. Among such salts are those formed with methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

2

To prepare the compounds of this invention, an appropriate aroylalkyl halide of the formula

is condensed with a piperidine of the formula

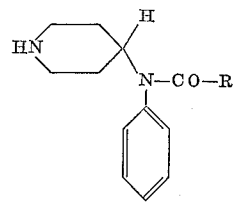

wherein Ar, Alk and R are defined as above. The reaction can be carried out in an inert solvent such as an aromatic hydrocarbon (e.g. benzene, toluene, xylene), a lower alkanol (e.g. ethanol, propanol, butanol), and a lower alkanone (e.g. acetone, butanone, pentanone, hexanone, and 4-methyl-2-pentanone). In certain cases the reaction can be usefully accelerated by use of elevated temperatures. The ketones thus obtained can be reduced with an appropriate reducing agent such as sodium borohydride to give the alcohols of the present invention. An alternate method for preparing the alkanols of the present inventions which can be used when Alk is methylene, involves heating styrene oxide with a substituted piperidine which corresponds to the formula given above in the preparation of the ketones of this invention.

To prepare the intermediate piperidines described above, 1-benzyl-4-piperidone is condensed with aniline to give N-(1-benzyl-4-piperidylidene)aniline. This compound is reduced to give 1-benzyl-4-anilinopiperidine which can be reacted with an acid chloride or acid anhydride to give the corresponding amide, with an alkyl chloroformate to give the corresponding urethane, or first with phosgene and then with an appropriate secondary amine to give the corresponding urea. The N-benzyl group is then removed by hydrogenation over palladium on charcoal at atmospheric pressure.

The compounds which constitute this invention and their preparation will appear more fully from a consideration of the following examples which are given for the purpose of illustration only and are not to be construed as limiting the invention in spirit or scope. In these examples, quantities are indicated in parts by weight, temperatures in degrees centigrade (° C.) and pressures in millimeters of mercury (mm).

Example 1

A mixture of 95 parts of 1-benzyl-4-piperidone, 60 parts of aniline, 800 parts of toluene, and 0.05 part of 4-toluenesulfonic acid is refluxed in a vessel provided with a water separator. After 15 hours the calculated amount of water has separated and the mixture is cooled. The toluene is evaporated and the residue is dissolved in 300 parts of diisopropyl ether with stirring. The solution is filtered and the solvent is evaporated from the filtrate. Distillation of the residue gives N-(1-benzyl-4-piperidylidene)-aniline boiling at about 170° C. at 0.05 mm. pressure.

A solution of 26 parts of N-(1-benzyl-4-piperidylidene) aniline in 200 parts of ether is added portionwise to a suspension of 8 parts of lithium aluminum hydride and 200 parts of ether. The reaction mixture is stirred and refluxed for 5 hours before it is cooled and decomposed by the addition of 200 parts of water. The mixture is acidified with 100 parts of 12 N hydrochloric acid to give a clear solution. The aqueous layer is separated and 64 parts of tartaric acid is added to this solution with stirring. The resultant solution is made strongly alkaline and extracted with 3 portions of benzene. The organic layer is dried over potassium carbonate and filtered and the solvent is evaporated. The resultant residue is recrystallized from petroleum ether to give 1-benzyl-4-anilinopiperidine melting at about 84.8–86° C.

*Example 2*

To a solution of 19.5 parts of 1-benzyl-4-anilinopiperidine in 160 parts of benzene is added portionwise a solution of 10 parts of acetic anhydride and 40 parts of benzene with stirring. The mixture is refluxed for 3 hours before it is cooled and alkalized with sodium hydroxide solution. The organic layer is separated, washed with water, dried and filtered and the solvent is evaporated from the filtrate. The residue is dissolved in petroleum ether and crystallized from solution on cooling to give N-(1-benzyl-4-piperidyl)-acetanilide melting at about 107–109.2° C. with decomposition. This compound has the following formula

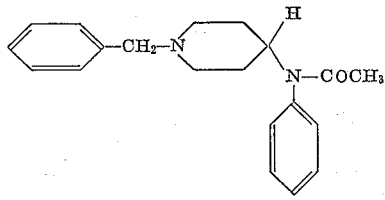

If the above procedure is repeated using propionic anhydride in place of acetic anhydride and using a reflux period of 6 hours instead of 3 hours, the product obtained is N-(1-benzyl-4-piperidyl)-propionanilide melting at about 74–76° C.

If the procedure of the first paragraph is repeated using butyric anhydride in place of acetic anhydride and using a reflux period of 16 hours instead of 3 hours the product is N-(1-benzyl-4-piperidyl)-butyranilide. This amine is dissolved in diisopropylether and hydrogen chloride is passed into the solution. The precipitated hydrochloride is filtered, boiled in ethyl acetate, and filtered again to give N-(1-benzyl-4-piperidyl)butyranilide hydrochloride melting at about 230–231° C.

*Example 3*

31 parts of 1-benzyl-4-anilinopiperidine is stirred in 120 parts of pyridine at room temperature. To this solution is added a solution of 18 parts of ethyl chloroformate in 32 parts of ether. After the addition is complete, the mixture is stirred at room temperature for 16 hours, and then on the water bath at 60–65° C. The mixture is cooled. The solid is filtered off and washed with acetone and then recrystallized from water to give ethyl N-(1-benzyl-4-piperidyl)-N-phenylcarbamate hydrochloride, melting at about 231–233° C. This compound has the following formula

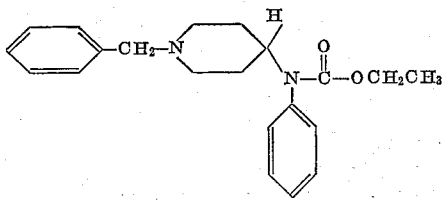

If an equivalent quantity of methyl chloroformate is substituted for the ethyl chloroformate and the above procedure is repeated, the product is methyl N-(1-benzyl-4-piperidyl)-N-phenylcarbamate hydrochloride.

*Example 4*

To a solution of 15 parts of phosgene in 56 parts of toluene is added portionwise a solution of 13.3 parts of 1-benzyl-4-anilinopiperidine in 24 parts of toluene. The resultant mixture is stirred at room temperature for 20 minutes and then heated on a water bath for 2 hours. A solid precipitates from the cooled mixture, and it is filtered off and washed with diisopropyl ether and dried to give N-(1-benzyl-4-piperidyl)-N-phenylcarbamyl chloride hydrochloride, melting at about 178–185° C. This compound has the following formula

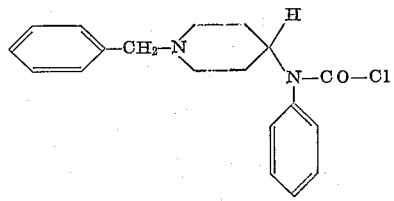

To a stirred mixture of 60 parts of piperidine in 120 parts of benzene is added portionwise 25 parts of N-(1-benzyl-4-piperidyl)-N-phenylcarbamyl chloride hydrochloride. The mixture is refluxed for 3 hours and then cooled, and 200 parts of water is added. The organic layer is separated, washed 3 times with 200 parts of water, dried over potassium carbonate and filtered, and the solvent is evaporated. The residue is recrystallized from petroleum ether to give N-(1-benzyl-4-piperidyl)-N-phenyl-N',N'-pentamethyleneurea, melting at about 115–116° C. This compound has the following formula

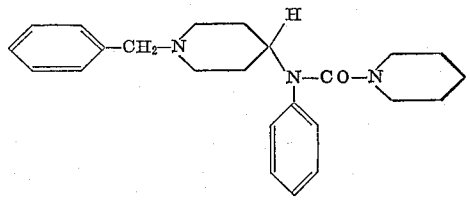

If equivalent quantities of the appropriate amine are substituted for piperidine and the above procedure is repeated, the following compounds are obtained:

N - (1 - benzyl - 4 - piperidyl) - N - phenyl - N',N'-tetramethyleneurea, melting at about 92–95.5° C.

N - (1 - benzyl - 4 - piperidyl) - N - phenyl - N',N'-dimethylurea, melting at about 99.8–101° C.

N - (1 - benzyl - 4 - piperidyl) - N - phenyl - N',N'-(3-oxapentamethylene)urea, melting at about 104–106° C.

*Example 5*

A solution of 16.5 parts of N-(1-benzyl-4-piperidyl) acetanilide in 160 parts of 2-propanol is hydrogenated at atmospheric pressure and room temperature in the presence of 3 parts of 10% palladium on charcoal catalyst. Hydrogenation is stopped after the calculated amount of hydrogen is taken up. The catalyst is filtered off and the solvent is evaporated. The residue is recrystallized from ether to give N-(4-piperidyl)-acetanilide melting at about 129–130° C.

If equivalent quantities of the appropriate piperidylamide are substituted for the N-(1-benzyl-4-piperidyl) acetanilide and the above procedure is repeated, the following compounds are obtained:

N-(4-piperidyl)propionanilide melting at about 83–85° C.

N-(4-piperidyl)butyranilide melting at about 93.4–95.8° C.

Ethyl N-(piperidyl)-N-phenylcarbamate hydrochloride melting at about 225–227° C. with decomposition.

N -(4 - piperidyl) - N - phenyl - N', N' - tetramethyleneurea melting at about 110.6–113° C. The hydrochloride of this compound melts at about 266–267° C.

N - (4 - piperidyl - N - phenyl - N',N' - pentamethyleneurea melting at about 101–103° C.

N - (4 - piperidyl) - N - phenyl - N',N' - (3 - oxapentamethylene)urea hydrochloride melting at about 254–256.5° C.

N - (4 - piperidyl) - N - phenyl - N',N' - dimethylurea hydrochloride melting at about 242–246° C.

Methyl N-(4-piperidyl)-N-phenylcarbamate hydrochloride.

Example 6

A mixture of 4.7 parts of phenacyl bromide, 4.5 parts of N-(4-piperidyl)propionanilide, 6 parts of sodium carbonate and 0.1 part of potassium iodide in 120 parts of 4-methyl-2-pentanone is stirred and refluxed for 16 hours. The reaction mixture is filtered while hot and the solvent is evaporated from the filtrate. The oily residue is dissolved in 160 parts of ether, filtered and concentrated to 60 parts. The resultant mixture is cooled at −15° C. to give N-(1-phenacyl-4-piperidyl)propionanilide melting at about 83–84.5° C. This compound has the following formula

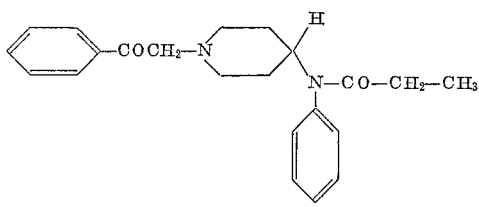

If equivalent quantities of the appropriate N-(4-piperidyl)alkananilides are substituted for the N-(4-piperidyl)propionanilide and the above procedure is repeated the following compounds are obtained.

N-(1-phenacyl-4-piperidyl)acetanilide melting at about 122–123° C.

N - (1 - phenacyl - 4 - piperidyl)butyranilide melting at about 107–108° C.

Example 7

To a refluxing mixture of 11.6 parts of N-(4-piperidyl)propionanilide, 80 parts of toluene, and 0.1 part of potassium iodide, is added portionwise a solution of 5.75 parts of α-bromopropiophenone and 40 parts of toluene. When the addition is complete, the mixture is stirred and refluxed for 24 hours. The crude reaction mixture is washed four times with 50 parts of water before it is dried over magnesium sulfate and the solvent is evaporated. The residue is dissolved in 280 parts of diisopropyl ether and hydrogen chloride gas is introduced into the solution to precipitate the hydrochloride. The diisopropyl ether is then decanted and the solid is recrystallized from 2-butanol to give N-[1-(α-methylphenacyl)-4-piperidyl]propionanilide hydrochloride melting at about 203–208° C.

Example 8

A mixture of 11.4 parts of α-bromobutyrophenone, 23.2 parts of N-(4-piperidyl)propionanilide, and 0.1 part of potassium iodide in 160 parts of toluene is heated in a sealed tube at 150° C. for 80 hours. The crude reaction mixture is shaken with 100 parts of water and the organic layer is separated, dried over magnesium sulfate and filtered and the solvent is evaporated. Recrystallization of the residue from ether gives N-[-1(α-ethylphenacyl)-4-piperidyl]propionanilide melting at about 108.6–109.2° C.

Example 9

A mixture of 8 parts of β-chloroprophenone, 7 parts of N-(4-piperidyl)acetanilide, 15 parts of sodium carbonate, and 0.1 part of potassium iodide in 200 parts of 4-methyl-2-pentanone is stirred and refluxed for 36 hours. The reaction mixture is filtered while hot and the solvent is evaporated from the filtrate. The residue is dissolved in 160 parts of ether and filtered and hydrogen chloride gas is introduced into the solution. The precipitated hydrochloride is filtered off and recrystallized from acetone to give N-[1-(β-benzoylethyl)-4-piperidyl]acetanilide hydrochloride melting at about 214–215.5° C.

Example 10

To a stirred mixture of 5 parts of N-(4-piperidyl)propionanilide, 6.85 parts of sodium carbonate, and 0.1 part of potassium iodide in 120 parts of 4-methyl-2-pentanone is added portionwise a solution of 4.54 parts of β-chloropropiophenone in 24 parts of 4-methyl-2-pentanone. After the addition is complete, the mixture is stirred and refluxed for 30 hours. The hot mixture is filtered and the solvent is evaporated from the filtrate to leave an oily residue which is dissolved in 56 parts of 2-propanol. This solution is added a solution of 2 parts of oxalic acid dihydrate in 24 parts of 2-propanol and the resultant mixture is boiled for 5 minutes. When the mixture is cooled at 0° C., a solid precipitates and it is filtered off and recrystallized from 2-propanol to give N - [1-(β-benzoylethyl)-4-piperidyl]propionanilide oxalate melting at about 150–151° C.

Example 11

To a stirred mixture of 5.7 parts of N-(4-piperidyl)propionanilide and 0.1 part of potassium iodide in 120 parts of 4-methyl-2-pentanone is added portionwise a solution of 7 parts of 2-(α-bromoacetyl)-thiophene in 80 parts of 4-methyl-2-pentanone. The mixture is stirred for 10 minutes. Ten parts of sodium carbonate is added and the mixture is slowly heated to reflux and refluxed for 20 hours. The reaction mixture is filtered and the solvent is evaporated from the filtrate. The residue is dissolved in 16 parts of 2-propanol and a solution of 1.8 parts of oxalic acid dihydrate in 8 parts of 2-propanol is added. The precipitated solid filtered off; it is N-[1-(2 - thenoylmethyl) - 4 - piperidyl]propionanilide oxalate melting at about 197–198° C. The free base of this compound melts at about 98–99.5° C.

Example 12

A mixture of 3 parts of styrene and 4.7 parts of N-(4-piperidyl)acetanilide is heated for 20 hours at 100° C. On cooling, a solid precipitate is formed and this is filtered off, boiled in 80 parts of diisopropyl ether, filtered off again and dried to give N-[1-(β-hydroxyphenethyl)-4-piperidyl]-acetanilide melting at about 125.8–128.6° C. This compound has the following formula

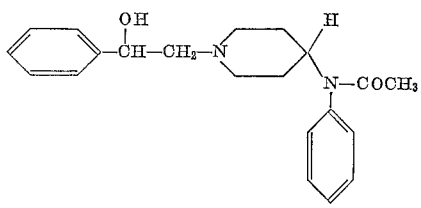

Example 13

A mixture of 3 parts of styrene oxide and 5 parts of N-(4-piperidyl)propionanilide is heated for 20 hours at 100° C. The cooled reaction mixture is dissolved in 300 parts of diisopropyl ether and hydrogen chloride gas is introduced into the solution. The precipitated hydrochloride is filtered off, boiled in 40 parts of 2-propanol, filtered again, washed with 2-butanone, and dried to give N-[1-(β-hydroxyphenethyl) - 4 - piperidyl]propionanilide hydrochloride melting at about 221.8–225.4° C.

Example 14

A mixture of 1.9 parts of styrene oxide and 3.5 parts of N-(4-piperidyl)butyranilide is heated for 20 hours at 100° C. The result thick oil is dissolved in 40 parts of boiling diisopropyl ether. The mixture is filtered until it is clear and then cooled to −15° C. N-[1-(β-hydroxyphenethyl)-4-piperidyl]butyranilide, melting at about 100–102° C., crystallizes from the solution.

*Example 15*

6.4 parts of the hydrochloride of N-[1-(α-methylphenacyl)-4-piperidyl]propionanilide is dissolved in water and alkalized with sodium hydroxide solution. The resultant mixture is extracted with benzene and the solvent is evaporated from the benzene solution. The residue is dissolved in 80 parts of methanol and to this solution is added portionwise at room temperature 0.37 part of sodium borohydride. The mixture is stirred and heated at 35° C. for 2 hours. The solvent is evaporated and the residue is boiled in 100 parts of water. The cooled aqueous solution is extracted with 3 portions of chloroform. The chloroform solution is dried over magnesium sulfate and the solvent is evaporated to leave a residue which is recrystallized from 20 parts of diisopropyl ether. The product obtained is N-[1-(β-hydroxy-α-methylphenethyl)-4-piperidyl]propionanilide melting at about 113.2–115.4° C.

*Example 16*

A mixture of 8 parts of N-[1-(α-ethylphenacyl)-4-piperidyl]propionanilide, 0.8 part of sodium borohydride, and 80 parts of methanol is heated for two hours at about 50° C. The solvent is evaporated and the residue is dissolved in 100 parts of ether with heating and vigorous stirring. The aqueous mixture is extracted with benzene and the benzene solution is dried and the solvent is evaporated. Recrystallization of the residue from 40 parts of ether gives N-[1-(α-ethyl-β-hydroxyphenethyl)-4-piperidyl]propionanilide melting at about 149–149.6° C. This compound has the following formula

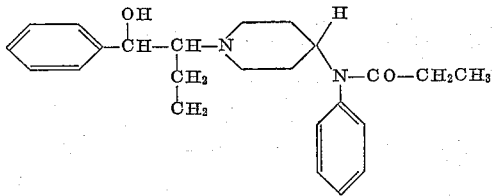

*Example 17*

A mixture of 5.8 parts of N-[1-(2-benzoylethyl)-4-piperidyl]propionanilide (isolated from its oxalate), and 0.3 part of sodium borohydride in 80 parts of methanol is stirred for 2 hours at 35° C. The solvent is evaporated and the residue is dissolved in 100 parts of 2 N hydrochloric acid. The resulting solution is alkalized and extracted with benzene. The solvent is evaporated from the dried benzene extract and the oily residue is dissolved in 40 parts of 2-propanol. To this solution is added a solution of 1.9 parts of oxalic acid dihydrate in 8 parts of 2-propanol and the mixture is boiled for 10 minutes and filtered. On standing at room temperature, a solid precipitates from the solution and this is recrystallized from 2-propanol to give N-[1-(3-hydroxy-3-phenylpropyl)-4-piperidyl]propionanilide oxalate melting at about 114–118° C.

*Example 18*

To a solution of 5 parts of N-[1-(2-thenoylmethyl)-4-piperidyl]propionanilide in 160 parts of methanol is added portionwise 0.65 part of sodium borohydride. After the addition is complete, the mixture is stirred and heated at about 50° C. for 2 hours. The solvent is evaporated and residue is mixed with 150 parts of water and refluxed for 5 minutes with stirring. The resultant mixture is extracted with benzene and the solvent is evaporated from the dried benzene extract. The residue is recrystallized from diisopropyl ether to give N-{1-[2-hydroxy-2-(2-thienyl)ethyl]-4-piperidyl}propionanilide melting at about 96–97° C.

*Example 19*

An aqueous solution of 3.88 parts of N-[1-(β-hydroxyphenethyl)-4-piperidyl]propionanilide is alkalized and extracted with toluene. The toluene solution is dried over magnesium sulfate and filtered and the solvent is evaporated. The residue is dissolved in 56 parts of benzene and 45 parts of propionic anhydride is added. The mixture is refluxed for 5 hours before it is cooled and the solvent is evaporated. The residue is alkalized with 1 N sodium hydroxide solution and extracted with diisopropyl ether. The solvent is evaporated from the dried diisopropyl ether solution and the residue is recrystallized from a mixture of 8 parts of petroleum ether and 4 parts of diisopropyl ether to give N-[1-(β-propionyloxyphenethyl)-4-piperidyl]-propionanilide melting at about 87–88.5° C.

If 35 parts of acetic anhydride is substituted for the 45 parts of propionic anhydride and the above procedure is repeated, the product is N-[1-(β-acetoxyphenethyl)-4-piperidyl]propionanilide which has the following formula

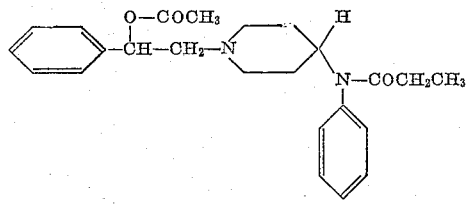

*Example 20*

A mixture of 4 parts of N-[1-(β-hydroxy-α-methylphenethyl)-4-piperidyl]propionanilide, 50 parts of propionic anhydride, and 48 parts of benzene is stirred and refluxed for 3 hours. The reaction mixture is cooled, the solvent is evaporated and the residue is dissolved in 50 parts of water. The aqueous solution is alkalized and extracted with 3 portions of benzene. The combined organic extracts are dried over magnesium sulfate and the solvent is evaporated. The residue is dissolved in 24 parts of 2-propanol and there is added a solution of 1.2 parts of oxalic acid dihydrate in 12 parts of 2-propanol and the resultant mixture is boiled. After cooling at room temperature there is obtained N-[1-(β-propionyloxy-α-methylphenethyl)-4-piperidyl]propionanilide oxalate melting at about 156–158° C. The free base of this compound has the following formula

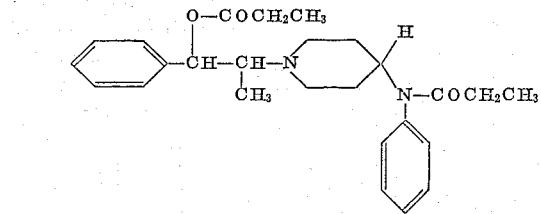

*Example 21*

A mixture of 2.5 parts of styrene oxide and 5 parts of ethyl N-(4-piperidyl)-N-phenylcarbamate is heated and stirred for 20 hours at 100° C. When the reaction mixture is cooled, a thick oil is obtained. This is crystallized from 48 parts of diisopropyl ether to give ethyl N-[1-(β-hydroxyphenethyl)-4-piperidyl]-N-phenylcarbamate melting at about 97–98° C.

If 2.5 parts of styrene oxide is heated with 5 parts of methyl N-(4-piperidyl)-N-phenylcarbamate according to the above procedure, the product is methyl N-(4-piperidyl)-N-phenylcarbamate. This compound has the following formula

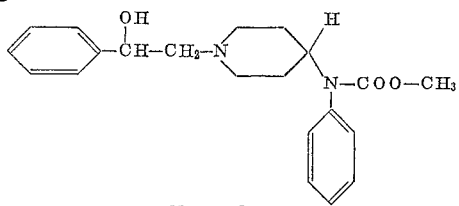

*Example 22*

A mixture of 4.25 parts of styrene oxide and 8.6 parts of N-(4-piperidyl)-N-phenyl-N',N'-pentamethylene-urea is heated for 20 hours at 100° C. After cooling, the reaction mixture is boiled in 40 parts of diisopropyl ether. This ether solution is filtered and the filtrate is kept at room temperature. The solid which crystallizes from solution is N-[1-(β-hydroxyphenethyl)-4-piperidyl]-N-phenyl - N',N' - pentamethyleneurea melting at about 105.5–106.6° C. This compound has the following formula

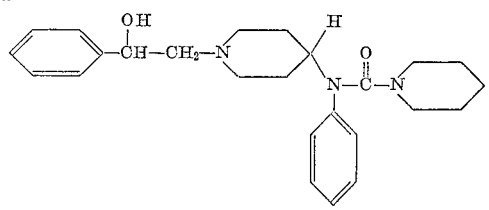

*Example 23*

A mixture of 4.25 parts of styrene oxide and 7.4 parts of N - (4-piperidyl)-N-phenyl-N',N'-dimethylurea (isolated from the corresponding hydrochloride) is heated for 20 hours at 100° C. The cooled mixture is boiled in 40 parts of diisopropyl ether, filtered and cooled to give N-[1-(β-hydroxyphenethyl)-4-piperidyl]-N-phenyl-N', N'-dimethylurea.

A mixture of 4.25 parts of styrene oxide and 8.32 parts of N-(4-piperidyl)-N-phenyl-N',N'-tetramethyleneurea is heated at 100° C. for 20 hours. The reaction mixture is cooled and then boiled in 80 parts of diisopropyl ether and filtered. On standing at room temperature, N-[1-(β-hydroxyphenethyl) - 4 - piperidyl]-N-phenyl-N',N'-tetramethyleneurea crystallizes from solution. This compound melts at about 144.2–146° C.

4.25 parts of styrene oxide is heated for 20 hours at 100° C. with the N-(4-piperidyl)-N-phenyl-N',N'-(3-oxa-pentamethylene)urea obtained by evaporation of the solvent from the dried benzene extracts of an alkalized aqueous solution of 9.8 parts of the corresponding hydrochloride. The cooled mixture is boiled in 40 parts of diisopropyl ether, filtered and cooled to give N-[1-(β-hydroxyphenethyl) - 4-piperidyl]-N-phenyl-N',N'-(3-oxapentamethylene)urea. This compound has the following formula

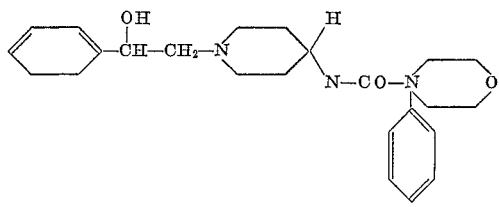

What is claimed is:
1. A compound of the formula

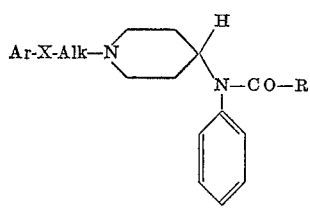

wherein Ar is selected from the group consisting of phenyl and thienyl; X is selected from the group consisting of —CO—, —CHOH—, and >CHO (lower alkanoyl); Alk is selected from the group consisting of methylene, ethylene, and alkyl methylene of less than 7 carbon atoms; R is selected from the group consisting of lower alkyl, lower alkoxy, dimethylamino, morpholino, 1-piperidinyl and 1-pyrrolidinyl.

2. A compound of the formula

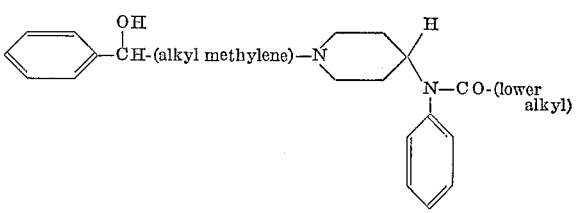

wherein said (alkyl methylene) consists of less than 7 carbon atoms.

3. A compound of the formula

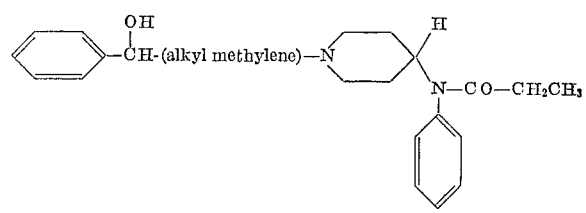

wherein said (alkyl methylene) consists of less than 7 carbon atoms.

4. N - [1 - (β - hydroxyphenethyl)-4-piperidyl]-propionanilide.

5. N - [1 - (β - hydroxy-α-methylphenethyl)-4-piperidyl]propionanilide.

6. N - [1 - (α - ethyl - β - hydroxyphenethyl) - 4 - piperidyl]propionanilide.

7. A compound of the formula

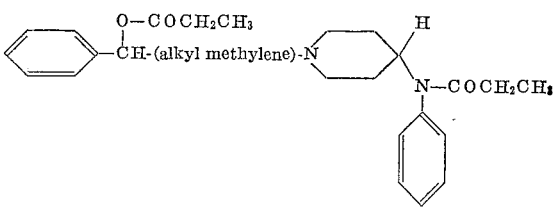

wherein said (alkyl methylene) consists of less than 7 carbon atoms.

8. N - [1 - (β - propionyloxyphenethyl) - 4-piperidyl]-propionanilide.

9. N - [1 - (α - methyl-β - propionyloxyphenethyl)-4-piperidyl]propionanilide.

10. N-[1 - (3 - hydroxy-3-phenyluropyl)-4-piperidyl]-propionanilide.

11. N - {1 - [2 - hydroxy - 2 - (2-thienyl)ethyl]-4-piperidyl}-propionanilide.

References Cited in the file of this patent
UNITED STATES PATENTS

| | | |
|---|---|---|
| 2,962,501 | Cutler et al. | Nov. 29, 1960 |
| 3,004,977 | Janssen | Oct. 17, 1961 |
| 3,012,030 | Janssen | Dec. 5, 1961 |

OTHER REFERENCES

Nazarov et al.: "Chemical Abstracts," vol. 54, page 8812 (1960).

UNITED STATES PATENT OFFICE
CERTIFICATE OF CORRECTION

Patent No. 3,171,838                      March 2, 1965

Paul A. J. Janssen

It is hereby certified that error appears in the above numbered patent requiring correction and that the said Letters Patent should read as corrected below.

Column 1, line 30, for " >CHO(lower alkanoyl)" read -- ⁻CHO(lower alkanoyl) --; column 4, line 71, for "N-(piperidyl)-" read -- N-(4-piperidyl)- --; column 6, line 18, for "This solution" read -- To this solution --; line 38, after "solid" insert -- is --; line 44, after "styrene" insert -- oxide --; same column 6, line 75, for "result" read -- resultant --; column 7, lines 38 to 46, for that portion of the formula reading

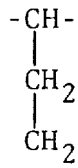      read      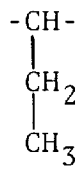

same column 7, line 54, for "resulting" read -- resultant --; column 8, line 75 and column 9, line 1, for "N- 4-piperidyl)-N-phenylcarbamate" read -- N-[1-(β-hydroxyphenethyl)-4-piperidyl]-N-phenylcarbamate --; column 9, line 39, for "8.32" read -- 8.2 --; column 10, line 3, for "-CO-, -CHOH-, and >CHO" read -- -CHOH- and ⁻CHO --; column 10, line 61, for "-phenyluropyl)-" read -- -phenylpropyl)- --.

Signed and sealed this 23rd day of November 1965.

(SEAL)
Attest:

ERNEST W. SWIDER                      EDWARD J. BRENNER
Attesting Officer                     Commissioner of Patents